(12) United States Patent
Wang et al.

(10) Patent No.: US 10,379,217 B2
(45) Date of Patent: Aug. 13, 2019

(54) SURVEILLANCE APPARATUS HAVING AN OPTICAL CAMERA AND A RADAR SENSOR

(71) Applicant: SONY CORPORATION, Tokyo (JP)

(72) Inventors: Qi Wang, Stuttgart (DE); Marcel Daniel Blech, The Hague (NL); Ralf Boehnke, Esslingen am Neckar (DE)

(73) Assignee: SONY CORPORATION, Tokyo (JP)

( * ) Notice: Subject to any disclaimer, the term of this patent is extended or adjusted under 35 U.S.C. 154(b) by 402 days.

(21) Appl. No.: 15/036,326

(22) PCT Filed: Nov. 19, 2014

(86) PCT No.: PCT/EP2014/075027
§ 371 (c)(1),
(2) Date: May 12, 2016

(87) PCT Pub. No.: WO2015/075072
PCT Pub. Date: May 28, 2015

(65) Prior Publication Data
US 2016/0291146 A1    Oct. 6, 2016

(30) Foreign Application Priority Data

Nov. 21, 2013 (EP) ...................................... 13193769

(51) Int. Cl.
*G01S 7/02* (2006.01)
*G01S 13/86* (2006.01)
(Continued)

(52) U.S. Cl.
CPC .............. *G01S 13/867* (2013.01); *G01S 7/03* (2013.01); *H01Q 1/22* (2013.01); *H01Q 5/22* (2015.01);
(Continued)

(58) Field of Classification Search
CPC ............. G01S 13/867; G01S 2007/027; G01S 2013/0245; G01S 7/03; H01Q 1/22; H01Q 21/065; H01Q 5/22; H01Q 5/40
(Continued)

(56) References Cited

U.S. PATENT DOCUMENTS 5,835,054 A    11/1998   Warhus et al.
6,150,974 A    11/2000   Tasaka et al.
(Continued)

FOREIGN PATENT DOCUMENTS

CN           1497952 A      5/2004
CN         102779823 A     11/2012
(Continued)

OTHER PUBLICATIONS

Combined Chinese Office Action and Search Report dated Jun. 2, 2017 in Patent Application No. 201480062686.5 (with English Translation of Category of Cited Documents).
(Continued)

*Primary Examiner* — Timothy X Pham
(74) *Attorney, Agent, or Firm* — Xsensus LLP

(57) ABSTRACT

A surveillance apparatus includes an optical camera that captures images based on received light, the optical camera including a camera aperture and a radar sensor including one or more transmitting antennas configured to emit electromagnetic radiation and one or more receiving antennas configured to receive electromagnetic radiation. The one or more transmitting antennas and the one or more receiving antennas form a virtual antenna array. The one or more transmitting antennas and the one or more receiving antennas are arranged such with respect to the optical camera that the center area of the virtual antenna array and the center area of the camera aperture coincide.

19 Claims, 7 Drawing Sheets

(51) Int. Cl.
*G01S 7/03* (2006.01)
*H01Q 1/22* (2006.01)
*H01Q 21/06* (2006.01)
*H01Q 5/22* (2015.01)
*H01Q 5/40* (2015.01)
*G01S 13/02* (2006.01)

(52) U.S. Cl.
CPC ............. *H01Q 5/40* (2015.01); *H01Q 21/065* (2013.01); *G01S 2007/027* (2013.01); *G01S 2013/0245* (2013.01)

(58) Field of Classification Search
USPC .......................................................... 342/52
See application file for complete search history.

(56) References Cited

U.S. PATENT DOCUMENTS

| | | | |
|---|---|---|---|
| 7,463,145 | B2 | 12/2008 | Jentoft |
| 9,778,351 | B1* | 10/2017 | Khosla .................. G01S 13/867 |
| 2004/0071460 | A1 | 4/2004 | Nishimura et al. |
| 2011/0102237 | A1* | 5/2011 | Hong ....................... G01S 13/92 342/55 |
| 2011/0163904 | A1 | 7/2011 | Alland et al. |
| 2011/0286632 | A1 | 11/2011 | Tuxen et al. |
| 2012/0226470 | A1* | 9/2012 | Seymour ................ G01C 11/02 702/150 |
| 2012/0287297 | A1 | 11/2012 | Fukuda |
| 2013/0093615 | A1* | 4/2013 | Jeon ................. G08B 13/19695 342/118 |
| 2014/0285375 | A1* | 9/2014 | Crain .................... G01S 13/885 342/25 A |
| 2014/0368373 | A1 | 12/2014 | Crain et al. |
| 2014/0368378 | A1 | 12/2014 | Crain et al. |
| 2015/0009324 | A1* | 1/2015 | Lee ........................ H04N 7/181 348/143 |
| 2015/0025788 | A1 | 1/2015 | Crain et al. |
| 2016/0306037 | A1* | 10/2016 | Johnson ................ G01S 7/4026 |

FOREIGN PATENT DOCUMENTS

| | | |
|---|---|---|
| CN | 103037142 A | 4/2013 |
| CN | 203181103 U | 9/2013 |
| DE | 40 10 242 A1 | 10/1991 |
| EP | 0 362 914 B1 | 12/1994 |
| JP | 2012-203455 A | 10/2012 |
| KR | 20-2010-0004219 U | 4/2010 |
| WO | WO 2010/042483 A1 | 4/2010 |
| WO | WO 2013/040274 A2 | 3/2013 |
| WO | WO 2013/040274 A3 | 3/2013 |
| WO | WO 2013/096704 A1 | 6/2013 |

OTHER PUBLICATIONS

N. Guan, et al., "Antennas Made of Transparent Conductive Films", Piers Online, vol. 4, No. 1, 2008, pp. 116-120.

Tursunjan Yasin, et al., "A Comparative Study on Two Types of Transparent Patch Antennas", IEEE, 2011, 4 Pages.

Wang, Qi, et al., "MM-Wave MIMO Radar Array for Security Camera", Report of Invention / Erfindungsmeldung Confidential / Vertraulich, Sony Deutschland GmbH. Germany, 2013, 16 Pages.

"Boxer Owl Ground Surveillance Radar Sharp Eye", Optical Radar, SSB-1004, Issue 2, downloaded on May 16, 2013, 2 Pages.

"Ground Surveillance Radar", TERMA, <http://www.terma.com/security-surveillance/radar-systems/ground-surveillance-radad>, downloaded on May 16, 2013, pp. 1-2.

"Security Sensor", UMRR Security Sensor Type 32 Data Sheet.doc, smart microwave sensors GmbH, Jul. 8, 2011, pp. 1-13.

Tursunjan Yasin , et al., "A Study on the Efficiency of Transparent Patch Antennas Designed from Conductive Oxide Films", IEEE, AP-S/URSI, 2011, pp. 3085-3087.

* cited by examiner

SURVEILLANCE APPARATUS HAVING AN OPTICAL CAMERA AND A RADAR SENSOR

CROSS-REFERENCE TO RELATED APPLICATIONS

The present application is based on PCT filing PCT/EP2014/075027 filed Nov. 19, 2014, and claims priority to European Patent Application 13193769.0 filed by the European Patent Office on 19 Nov. 2014, the entire contents of each of which being incorporated herein by reference.

BACKGROUND

Field of the Disclosure

The present disclosure relates to the field of surveillance cameras for safety and security applications. A surveillance apparatus, having an optical camera and an additional radar sensor, and a corresponding surveillance method are disclosed. Application scenarios include burglar, theft or intruder alarm as well as monitoring public and private areas, inside or outside.

Description of Related Art

Optical surveillance cameras are used in many public places such as train stations, stadiums, supermarkets and airports to prevent crimes or to identify criminals after they committed a crime. Optical surveillance cameras are widely used in retail stores for video surveillance. Other important applications are safety-related applications including the monitoring of hallways, doors, entrance areas and exits for example emergency exits.

While optical surveillance cameras show very good performance under regular operating conditions, these systems are prone to visual impairments. In particular, the images of optical surveillance cameras are impaired by smoke, dust, fog, fire and the like. Furthermore, a sufficient amount of ambient light or an additional artificial light source is required, for example at night.

An optical surveillance camera is also vulnerable to attacks of the optical system, for example paint from a spray attack, stickers glued to the optical system, cardboard or paper obstructing the field of view, or simply a photograph that pretends that the expected scene is monitored. Furthermore, the optical system can be attacked by laser pointers, by blinding the camera or by mechanical repositioning of the optical system.

In addition to imaging a scenery, it can be advantageous to obtain information about the distance to an object or position of an object or a person in the monitored scenery. A three-dimensional image of a scenery can be obtained, for example, with a stereoscopic camera system. However, this requires proper calibration of the optical surveillance cameras which is very complex, time consuming, and expensive. Furthermore a stereoscopic camera system typically is significantly larger and more expensive compared to a monocular, single camera setup. Further, the range measurement accuracy is degrading with increased distance to the object, making stereoscopic camera based depth sensors useless for long range applications.

In a completely different technological field, automotive driver assistance systems, US 2011/0163904 A1 discloses an integrated radar-camera sensor for enhanced vehicle safety. The radar sensor and the camera are rigidly fixed with respect to each other and have a substantially identical, limited field of view.

The "background" description provided herein is for the purpose of generally presenting the context of the disclosure. Work of the presently named inventor(s), to the extent it is described in this background section, as well as aspects of the description which may not otherwise qualify as prior art at the time of filing, are neither expressly or impliedly admitted as prior art against the present disclosure.

SUMMARY

It is an object of the present disclosure to provide a surveillance apparatus and a corresponding surveillance method which overcome the above-mentioned drawbacks. It is a further object to provide a corresponding computer program and a non-transitory computer-readable recording medium for implementing said method. In particular, it is an object to expand the surveillance capabilities to measurement scenarios where a purely optical camera fails and to efficiently and flexibly monitor a desired field of view.

According to an aspect of the present disclosure there is provided a surveillance apparatus comprising an optical camera configured to capture images based on received light, said optical camera having a camera aperture, a radar sensor having one or more transmitting antennas configured to emit electromagnetic radiation and one or more receiving antennas configured to receive electromagnetic radiation, said one or more transmitting antennas and said one or more receiving antennas forming a virtual antenna array, wherein said one or more transmitting antennas and said one or more receiving antennas are arranged such with respect to the optical camera that the center area of the virtual antenna array and the center area of the camera aperture coincide.

According to a further aspect of the present disclosure there is provided a corresponding surveillance method comprising the steps of capturing images based on received light with an optical camera, said optical camera having a camera aperture, and emitting and receiving electromagnetic radiation with a radar sensor, having one or more transmitting antennas configured to emit electromagnetic radiation and one or more receiving antennas configured to receive electromagnetic radiation, said one or more transmitting antennas and said one or more receiving antennas forming a virtual antenna array, wherein said one or more transmitting antennas and said one or more receiving antennas are arranged such with respect to the optical camera that the center area of the virtual antenna array and the center area of the camera aperture coincide.

According to a further aspect of the present disclosure there is provided a surveillance radar apparatus for retrofitting an optical surveillance camera having a camera aperture, said surveillance radar apparatus comprising a housing for arrangement of the surveillance radar apparatus at the surveillance camera, and a radar sensor having one or more transmitting antennas configured to emit electromagnetic radiation and one or more receiving antennas configured to receive electromagnetic radiation, said one or more transmitting antennas and said one or more receiving antennas forming a virtual antenna array, wherein said one or more transmitting antennas and said one or more receiving antennas are arranged such with respect to the optical camera that the center area of the virtual antenna array and the center area of the camera aperture coincide.

According to still further aspects a computer program comprising program means for causing a computer to carry out the steps of the method disclosed herein, when said computer program is carried out on a computer, as well as a non-transitory computer-readable recording medium that stores therein a computer program product, which, when executed by a processor, causes the method disclosed herein to be performed are provided.

Preferred embodiments are defined in the dependent claims. It shall be understood that the claimed surveillance radar apparatus for retrofitting a surveillance camera, the claimed surveillance method, the claimed computer program and the claimed computer-readable recording medium have similar and/or identical preferred embodiments as the claimed surveillance apparatus and as defined in the dependent claims.

The present disclosure is based on the idea to provide additional sensing means, i.e., a radar sensor, that complements surveillance with an optical camera and to integrate said radar sensor appropriately into the disclosed surveillance apparatus. A radar sensor can work in certain scenarios where an optical sensor has difficulties, such as adverse weather or visual conditions, for example, snowfall, fog, smoke, sandstorm, heavy rain or poor illumination or darkness. Moreover, a radar sensor can still operate after vandalism to the optical system. Synergy effects are provided by jointly evaluating the images captured by the (high-resolution) optical camera and the received electromagnetic radiation by the radar sensor.

The integration of the antennas of the radar sensor into the surveillance apparatus as disclosed, for instance into the frame of the optical camera, has the effect that both the radar sensor and the optical camera substantially have the same field of view or at least "look" into the same direction and can simultaneously "see" the same scenery. This is achieved by providing that the center area, i.e. an area including and/or being located close to the center, of the optical aperture of the optical camera and the center area, i.e. an area including and/or being located close to the center, of the virtual antenna array coincide or are at least overlapping to a substantial extent.

The disclosed surveillance apparatus is not limited to the use of a single camera only, but may comprise two or more cameras. In case of a single optical camera having a single camera aperture the center area of the camera aperture corresponds to the central point of the camera aperture. In case of two or more optical cameras each having an individual camera aperture the individual camera apertures form a single common camera aperture and wherein the center area of the common camera aperture corresponds to the central area of the individual camera apertures.

This arrangement further enables that both the radar sensor and the optical camera may be moved together by movement elements, e.g. the mechanics, actuators or motors, which is already available for the optical camera, so that also during and after such a movement both the radar sensor and the optical camera look to the same scenery. No additional means is needed for the radar sensor to enable such a movement. In such a configuration, the radar sensor and the camera are preferably co-located and jointly moved. Therefore, no space/angle synchronization is needed for the data fusion from both the radar sensor and the camera. The radar sensor may have a fixed antenna beam, e.g. for range detection, or may employ a 1D or 2D antenna array for 1D or 2D beam forming, which provides the radar sensor with electrical angular scanning capability.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE EMBODIMENTS

Figure 1:
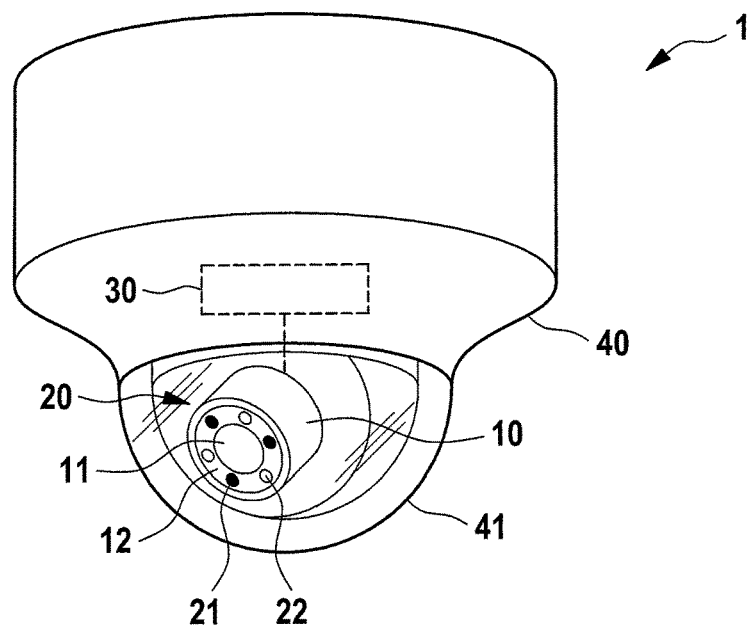
FIG. 1 shows a first embodiment of a surveillance apparatus according to the present disclosure.

Referring now to the drawings, wherein like reference numerals designate identical or corresponding parts throughout the several views, FIG. 1 shows a first embodiment of a surveillance apparatus 1 according to the present disclosure. It comprises an optical camera 10 configured to capture images based on received light, said optical camera 10 having a camera aperture 11. The surveillance apparatus 1 further comprises a radar sensor 20 having one or more (here three) transmitting antennas 21 (indicated by full circles) configured to emit electromagnetic radiation and one or more (here three) receiving antennas 22 (indicated by empty circles) configured to receive electromagnetic radiation. In this embodiment the antennas 21, 22 are arranged on the frame 12 of the camera 10 around the camera aperture 11. Due to their arrangement the antennas 21, 22 form a virtual antenna array, as will be explained in more detail below that is overlapping with the camera aperture 11.

The optical camera 10 is preferably a security camera having a camera objective including a camera lens forming the camera aperture 11. Optionally, the camera objective is a zoom objective for magnifying a scenery. The front part of the optical camera 11 may further comprise a camera cover for protecting the camera objective (lens). The housing together with the camera cover provide a certain degree of protection against vandalism. However, an optical camera is still vulnerable to attacks on the optical system. Such attacks include, but are not limited to, spray and paint attacks, gluing or sticking optically non-transparent materials on the camera cover or blinding the camera by a laser.

The optical camera 10 optionally features a light source for illuminating a region of interest in front of the camera. For instance, a ring of infrared (IR) light emitting diodes (LEDs) for illuminating the region of interest with non-visible light may be provided (not shown). To a certain extent, this enables unrecognized surveillance and surveillance in darkness over a limited distance.

Further optionally, the surveillance apparatus 1 comprises a movement unit 30, such as a motor, actuator, actor, etc. for moving the camera 10, in particular for rotating, panning and/or tilting it in one or more directions. By moving the camera, a larger area can be monitored. However the movement speed is limited. Different areas cannot be monitored at the same time but have to be monitored sequentially.

In this embodiment the surveillance apparatus 1 further comprising a housing 40 with a substantially circular outline. This housing 40 is typically mounted to or into a ceiling, but the apparatus may generally also be mounted to a wall, pole or another apparatus. The surveillance apparatus 1 further comprises a translucent camera cover 41 in which the optical camera 10 is arranged. In this embodiment, the camera cover 41 comprises a substantially hemispheric camera dome 41. However, the camera cover 41 is not limited in this respect.

Figure 2:
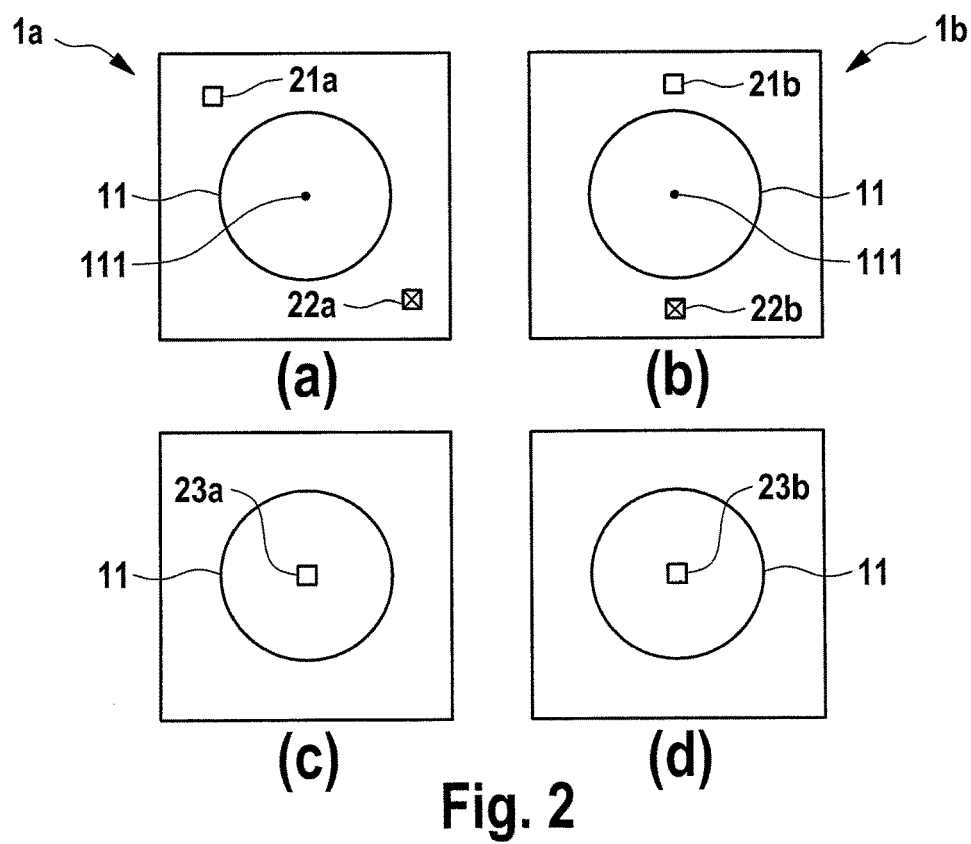
FIG. 2 shows a second and third embodiment of a surveillance apparatus according to the present disclosure.

FIG. 2 shows a second (FIG. 2(*a*)) and third (FIG. 2(*b*)) embodiment 1*a*, 1*b* of a surveillance apparatus 1*a*, 1*b* according to the present disclosure, particularly of the radar sensor and the camera aperture. In this and the following figures transmitting (Tx) antennas are indicated by filled rectangles, receiving (Rx) antennas are indicated by rectangles with crosses and virtual antennas are indicated by empty rectangles. In both radar sensors only one Tx antenna 21*a*, 21*b* and one Rx antenna 22*a*, 22*b* are used. Both antennas cover the same field of view as of the optical camera. The Tx antenna and Rx antenna pair is equivalent to one virtual antenna 23*a*, 23*b*. The position of the virtual antenna 23*a*, 23*b* coincides with the center area 111 (in particular the center point) of the camera aperture as shown in FIGS. 2(*c*) (showing the virtual antenna 23*a* for the radar sensor shown in FIGS. 2(*a*)) and 2(*d*) (showing the virtual antenna 23*b* for the radar sensor shown in FIG. 2(*b*)). Therefore the radar sensor and the optical camera are pointing to the scene from the same perspective. This configuration allows the detection of the appearance of the target in the field of view, detention the target distance to the sensors and identifying the speed of the target movement.

FIGS. 3 to 8 show a fourth to ninth embodiment of a surveillance apparatus 1*c* to 1*h* according to the present disclosure, particularly of the radar sensor and the camera aperture, according to which the antennas are arranged at the periphery of the camera aperture.

Figure 3:
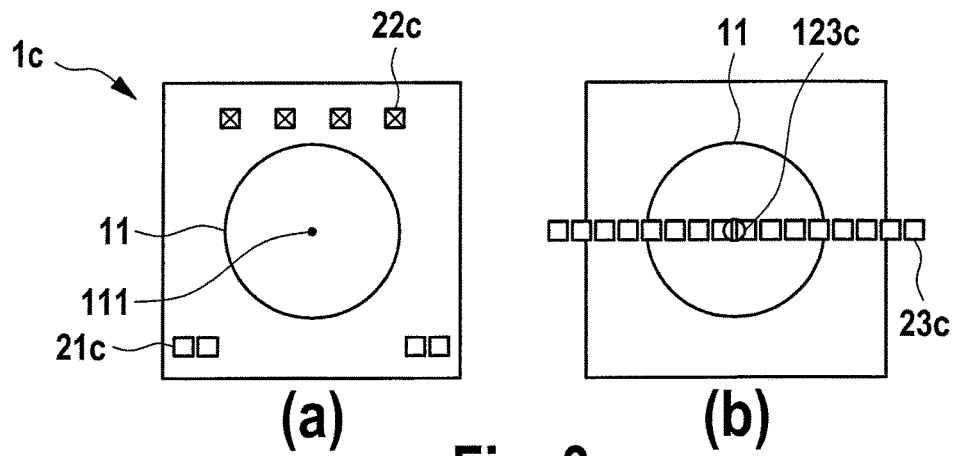
FIG. 3 shows a fourth embodiment of a surveillance apparatus according to the present disclosure.
Figure 4:
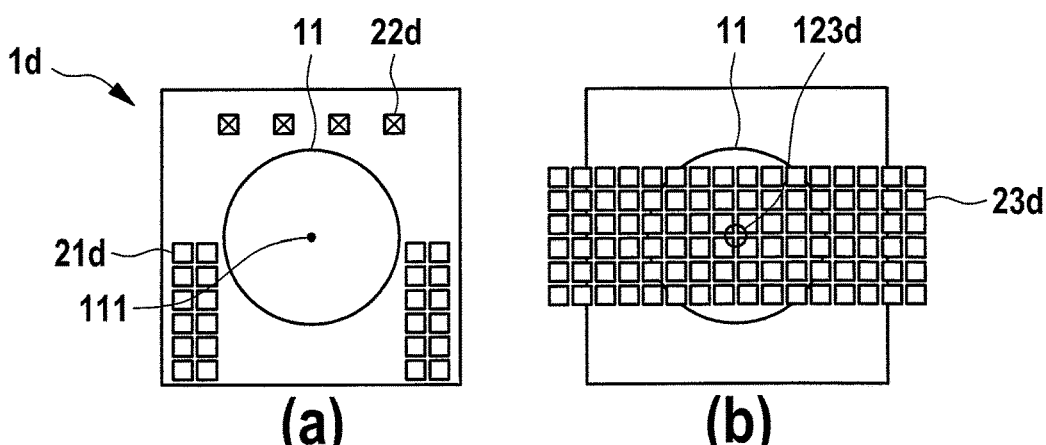
FIG. 4 shows a fifth embodiment of a surveillance apparatus according to the present disclosure.

The embodiments 1*c*, 1*d* shown in FIGS. 3 and 4 each use a 1D MIMO antenna array having multiple Tx antennas 21*c*, 21*d* and multiple Rx antennas 22*c*, 22*d*. All the antennas cover the field of view of the optical camera. Each pair of Tx and Rx antennas is equal to one virtual antenna 23*c*, 23*d* (positioned at the spatial convolution of the real Tx and Rx antenna). All the combinations of Tx antenna and Rx antenna pairs are equal to a 1D virtual antenna array as shown in FIGS. 3(*b*), 4(*b*).

In the embodiment shown in FIG. 3(*b*), the center area 123*c* of the virtual antenna array coincides with the center area 111 (in particular the center point) of the camera aperture. In this configuration, the radar sensor and the optical camera are pointing to the scene from the same perspective. In the embodiment 1*d* shown FIG. 4(*a*), linear phased array antennas are preferably used for Tx antennas 21*d* to generate a sharp beam in vertical dimension. The Tx antenna arrays together with the Rx antennas 22*d* form a MIMO array; the equivalent virtual array 23*d* with its center area 123*d* is shown in FIG. 4(*b*). In vertical direction, each column is a linear phased array which generates a sharp beam in vertical dimension. In horizontal direction, all columns form a linear array. A sharp beam can be generated and electronically scanned in horizontal direction by electronic beam forming technique. These configurations allow the detection of the appearance of the target in the field of view, detection the target position in a 2D plane and identifying the speed of the target movement.

Figure 5:
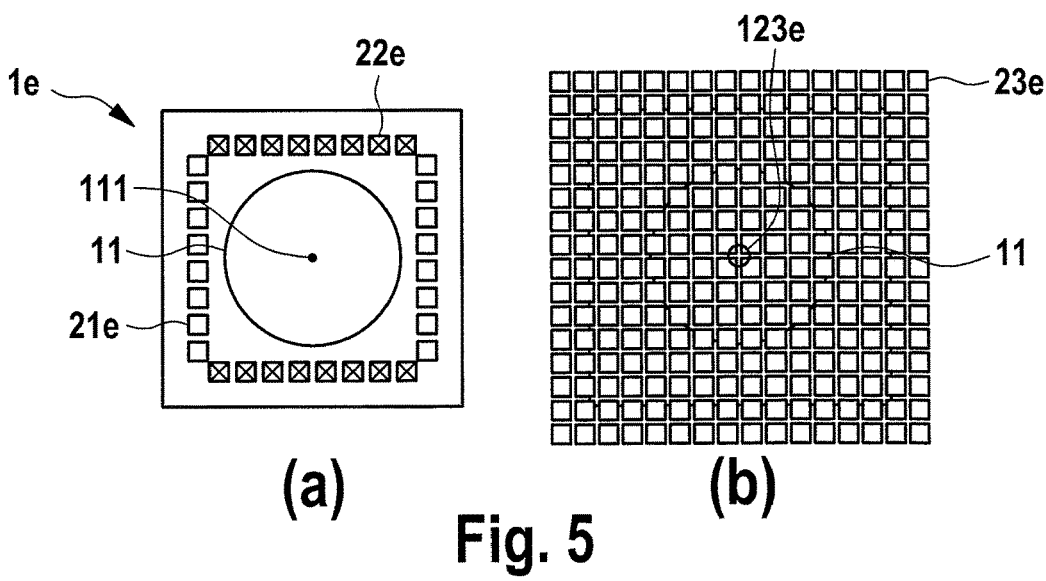
FIG. 5 shows a sixth embodiment of a surveillance apparatus according to the present disclosure.
Figure 6:
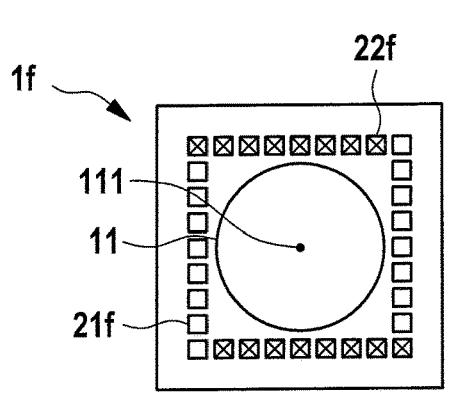
FIG. 6 shows a seventh embodiment of a surveillance apparatus according to the present disclosure.
Figure 6:
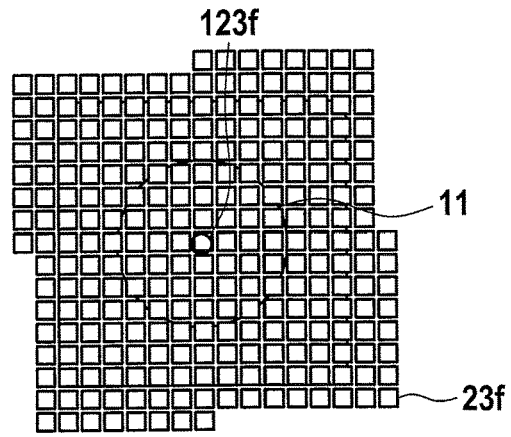

The embodiments of a surveillance apparatus 1*e* to 1*f* shown in FIGS. 5 and 6 use a combination of the optical camera with a 2D MIMO antenna array having multiple Tx antennas 21*e*, 21*f* and multiple Rx antennas 22*e*, 22*f*. All the antennas cover the field of view of the optical camera. Each pair of Tx and Rx antennas is equal to one virtual antenna 23*e*, 23*f* having a respective center area 123*e*, 123*f*. All the combinations of Tx antenna and Rx antenna pairs are equal to a 2D virtual antenna array as shown in FIGS. 5(*b*), 6(*b*).

In the embodiment shown in FIG. 5(*a*) two lines of Tx antennas 21*e* and two lines of Rx antennas 22*e* are arranged in a square shape. The virtual antenna array is a 2D square array as shown in FIG. 5(*b*). The center area 123*e* of the virtual antenna array coincides with the center area 111 of the camera aperture. Therefore, the radar sensors and the optical camera are pointing to the scene from the same perspective. In FIG. 6, a variation of the 2D square array of FIG. 5 is shown.

It shall be noted that in these configurations, the number of Tx antennas and the number of Rx antennas do not need to be equal. Therefore the 2D virtual antenna array can be square and rectangular as well.

Figure 7:
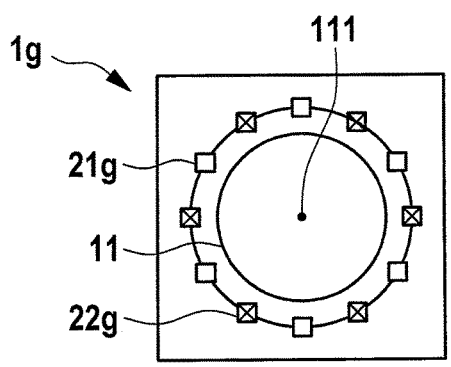
FIG. 7 shows an eighth embodiment of a surveillance apparatus according to the present disclosure.
Figure 7:
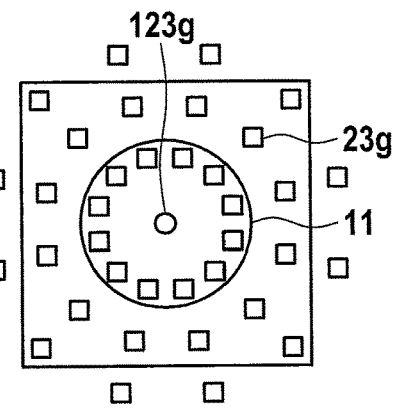
Figure 8:
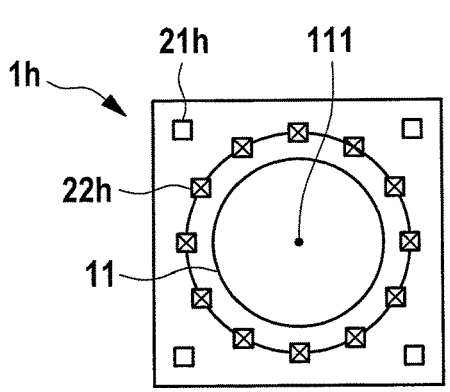
FIG. 8 shows a ninth embodiment of a surveillance apparatus according to the present disclosure.
Figure 8:
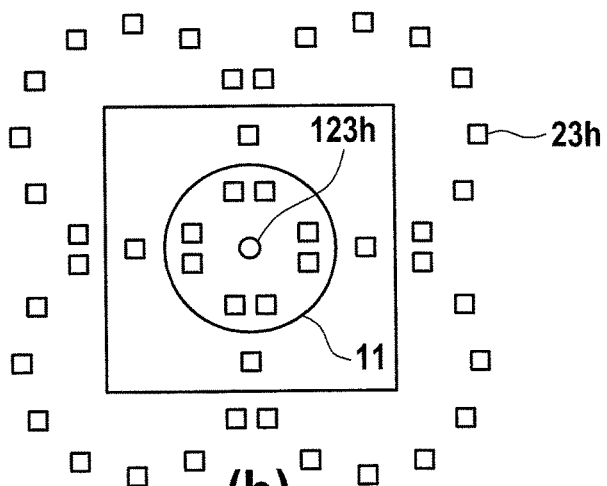

The embodiments of a surveillance apparatus 1*g* and 1*h* shown in FIGS. 7 and 8 use a combination of optical camera with a radar MIMO array of circular shape which fits the frame of the camera better. These radar MIMO arrays have multiple Tx antennas 21*g*, 21*h* and multiple Rx antennas 22*g*, 22*h*. All the antennas cover the field of view of the optical camera. The equivalent virtual antenna arrays formed of virtual antennas 23*g*, 23*h* are shown in FIGS. 7(*b*) and 8(*b*), respectively. Both of these two arrays have same array center areas 123*g*, 123*h* which coincide with the center area 111 of the camera aperture. These configurations allow the detection of the appearance of the target (or multiple targets) in the field of view, detection of the target position in 3D space and identifying the speed of the target movement.

The above explained embodiments use antennas, which are located at the periphery of the camera aperture. In some cases it may, however, be beneficial to place the antennas directly in front of the camera aperture 11, e.g. right on top of the camera lens. In such embodiments of the surveillance apparatus 1i to 1m shown in FIGS. 9 to 13 optically translucent (including transparent) antennas are used. Indium tin oxide (ITO) is a well-known optically translucent material, which also exhibits good electrical conductivity. As another embodiment, planar patch antennas or patch antenna arrays can be manufactured on a thin quartz glass or fused silica glass wafer by a sputtering process. On the back side of the wafer, a ground plane of ITO needs to be sputtered as well. The glass waver is placed on top of the lens. Alternatively, metal mesh structures can be used to form optically transparent antennas. The metal mesh can be carried on a transparent polymer film such as e.g. polyethylene naphtalate (PEN). It can even be retrofit to existing optical cameras to upgrade their capabilities. On top of the translucent antenna an additional glass cover can be placed to protect the antenna from the environment (water, snow, etc.). This protection layer is optional.

Figure 9:
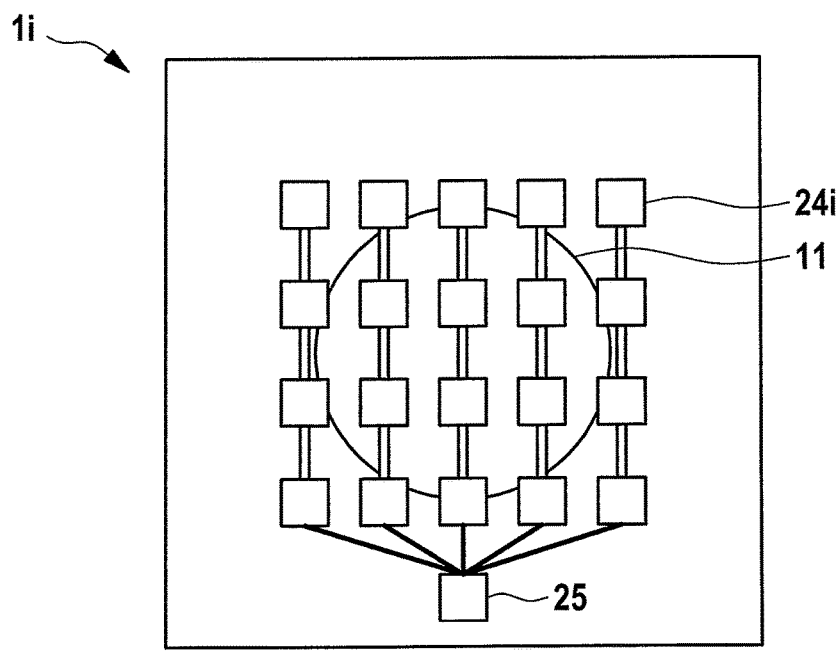
FIG. 9 shows a tenth embodiment of a surveillance apparatus according to the present disclosure.

In FIG. 9 a 2D antenna array comprising 1D serial fed patch antenna arrays is depicted. The ports of the Tx/Rx antennas 24i are combined by a feed network 25 (e.g. a MMIC), which is preferably also realized by a ITO structure on the top of the wafer to generate a large antenna aperture, which yields a sharp pencil beam pointing to a fixed direction. By using the entire area on top of the camera aperture (e.g. the camera lens) such a beam can be generated.

Figure 10:
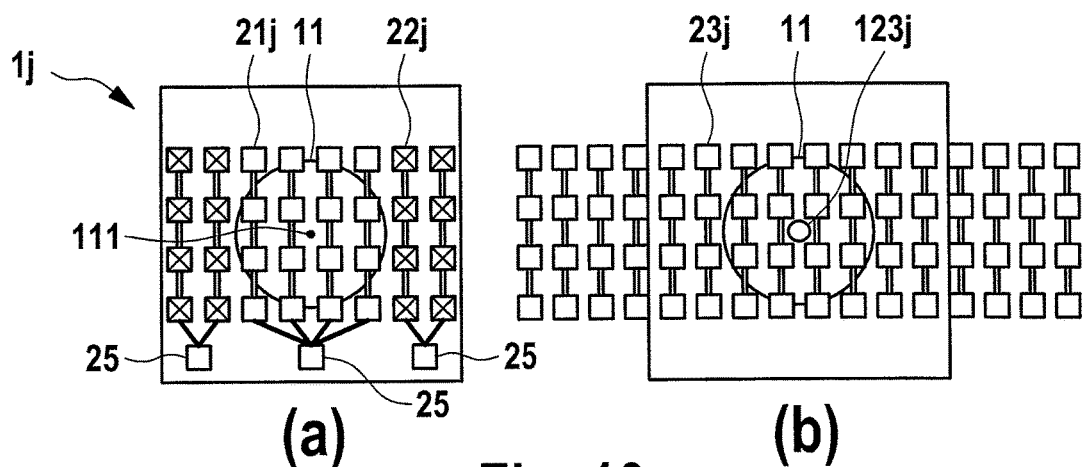
FIG. 10 shows an eleventh embodiment of a surveillance apparatus according to the present disclosure.
Figure 11:
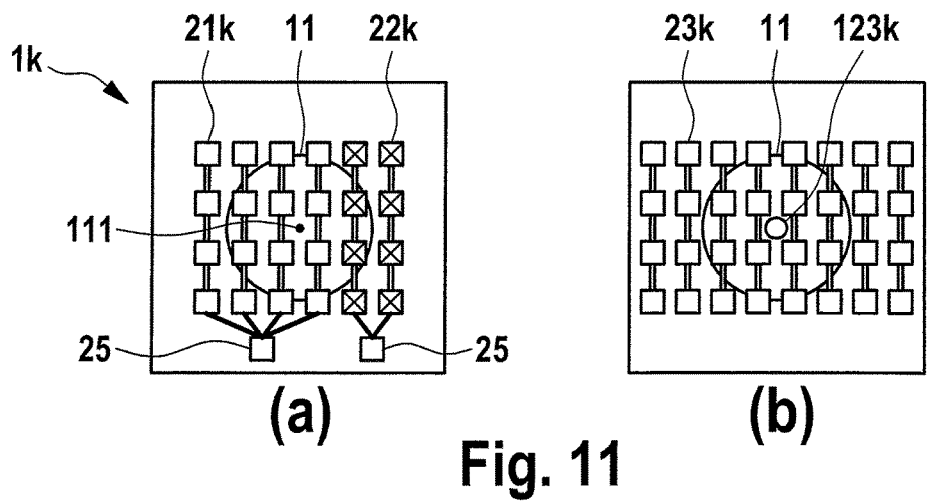
FIG. 11 shows a twelfth embodiment of a surveillance apparatus according to the present disclosure.
Figure 12:
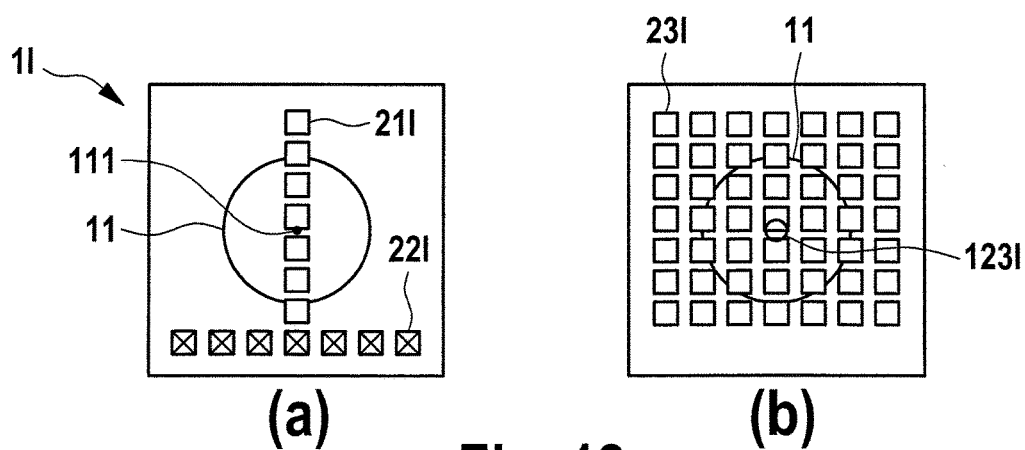
FIG. 12 shows a thirteenth embodiment of a surveillance apparatus according to the present disclosure.

If electronic 1D beam scanning in the horizontal plane should be employed, it is in many applications beneficial to focus the beam in the vertical plane. Therefore, 1D series fed patch antenna arrays can be used. In FIGS. 10 and 11 two embodiments of a surveillance apparatus 1j and 1k employing MIMO beamforming are shown. The symmetric arrangement in FIG. 10 yields a larger virtual aperture size than the asymmetric arrangement depicted in FIG. 11. Both of them use translucent Tx antennas 21j, 21k and translucent Rx antennas 22j, 22k, at least for the antennas that are arranged in front of the camera aperture. As the patch antenna arrays have a large extent in the vertical dimension it is difficult or impossible to place them around the camera aperture. The virtual antenna arrays formed by the virtual antennas 23j, 23k having center areas 123j, 123k are shown in FIGS. 10(b) and 11(b).

Figure 13:
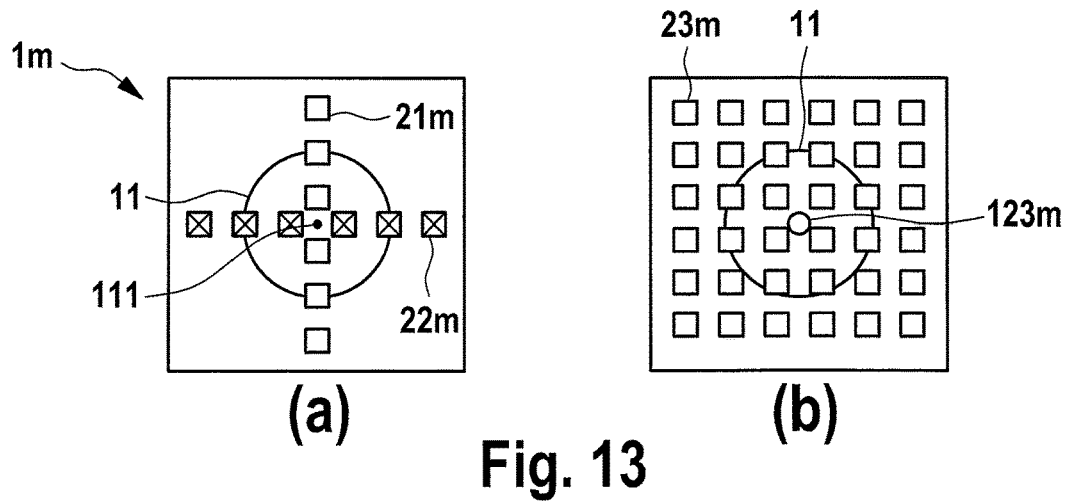
FIG. 13 shows a fourteenth embodiment of a surveillance apparatus according to the present disclosure.

Using optically transparent antennas further allows the usage of very commonly employed MIMO arrangements such as e.g. the T-shape (used in the surveillance apparatus 1l shown in FIG. 12 having Tx antennas 21l and Rx antennas 22l resulting in virtual antennas 23l having a center area 123l) or the plus-shape (used in the surveillance apparatus 1m shown in FIG. 13 having Tx antennas 21m and Rx antennas 22m resulting in virtual antennas 23m having a center area 123m). Both of them result in 2D virtual apertures, which can be used for 2D electronic beam scanning.

In order to feed the optically translucent antennas, a proper transition from a RF substrate (e.g. Rogers, Arlon, etc.) carrying the MMICs and the RF circuit, which is not transparent, to the glass substrate is preferably used. For this purpose a microstrip to microstrip transition 200 as depicted in FIG. 14 can be used.

The RF circuit 230 (e.g. a MMIC) is located in this embodiment on a first surface 251 of a RF PCB 250 (also called RF substrate). This PCB 250 is generally not optically transparent and may thus be designed for small size. On the same surface 251 of the PCB 250 a microstrip line 241 is provided. On the opposite surface 252 of the PCB 250 a ground plane 253 is arranged. Both the microstrip line 241 and the ground plane 253 are e.g. made of copper.

Figure 14:
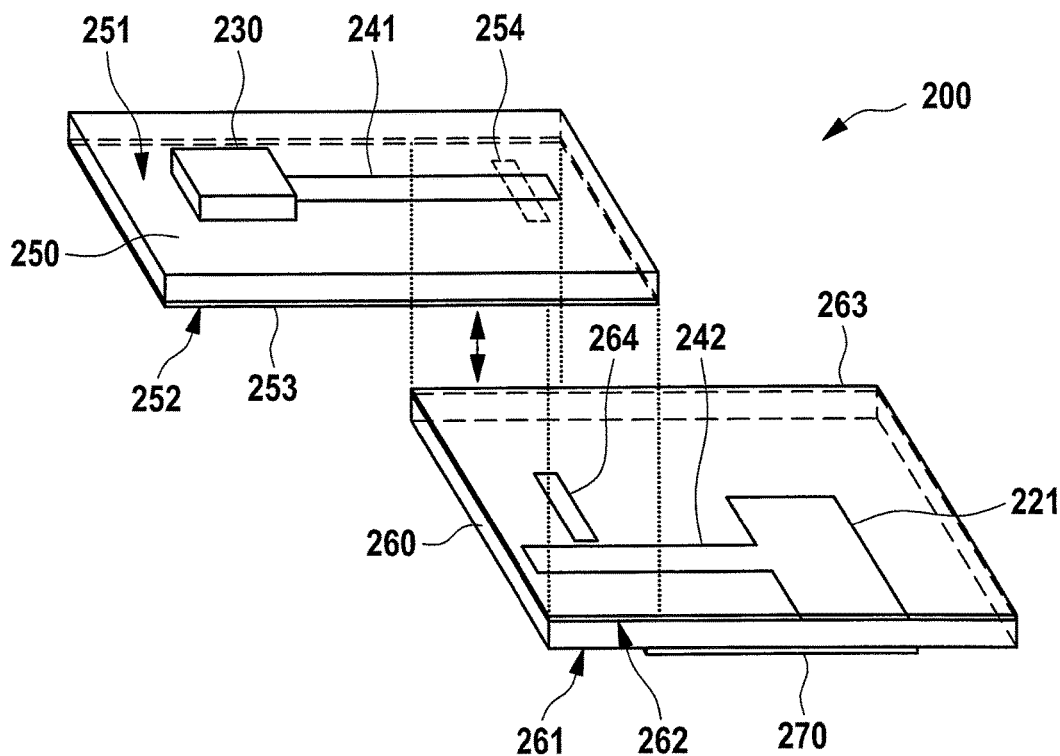
FIG. 14 shows a perspective view of an exemplary implementation of parts of a surveillance apparatus according to the present disclosure.

On a first surface 261 another substrate 260, which is e.g. made of quartz of fused silica or a polymer foil such as e.g. polyethylene naphthalate (PEN) and which is preferably transparent, the linear array of (preferably transparent or translucent) antennas, represented in FIG. 14 by a single planar antenna 221, is arranged. On the same surface 261 of the substrate a microstrip line 242 is provided. On the opposite surface 262 of the substrate 260 a ground plane 263 is arranged. The microstrip line 242, the planar antenna 221 and the ground plane 263 are preferably made of a substantially transparent or translucent material, e.g. are made of ITO or a metal mesh.

Further, in order to interconnect the microstrip lines 241 and 242 (also called antenna feed lines) and, thus, to connect the RF circuit 230 and the antenna 221, a microstrip based transition may be used. The RF signal is coupled via a slot 254, 264 in the ground planes 253, 263 (which form a common ground plane, when the PCB 250 and the substrate 260 are combined) from the microstrip line 241 on the PCB 250 to the microstrip line 242 on the substrate 260 and vice versa. For this interconnection no vias are needed. The PCB 250 and the substrate 260 only need to be laminated or tightly pressed together. The RF circuit 230 can be powered by a cable. The data interface to the controller, the processor and/or a visualization system may be wired or wireless.

ITO (indium tin oxide) can be fabricated as thin film (100 . . . 2000 nm thickness) with a good optical transparency. In the mm-wave frequency range the skin depth in ITO is a few μm, which is much more than the typical film thickness of a few 100 nm. Hence, there may be losses (more than 30 dB/cm on a microstrip line). Accordingly, in another embodiment the planar patch antennas made of ITO are replaced by wire meshes made of a good electric conductor (e.g. gold or copper). The grid parameters can either be macroscopically small like the heating in a windscreen of a car or electrically small compared to the wavelength of light in order to be really invisible.

Figure 15:
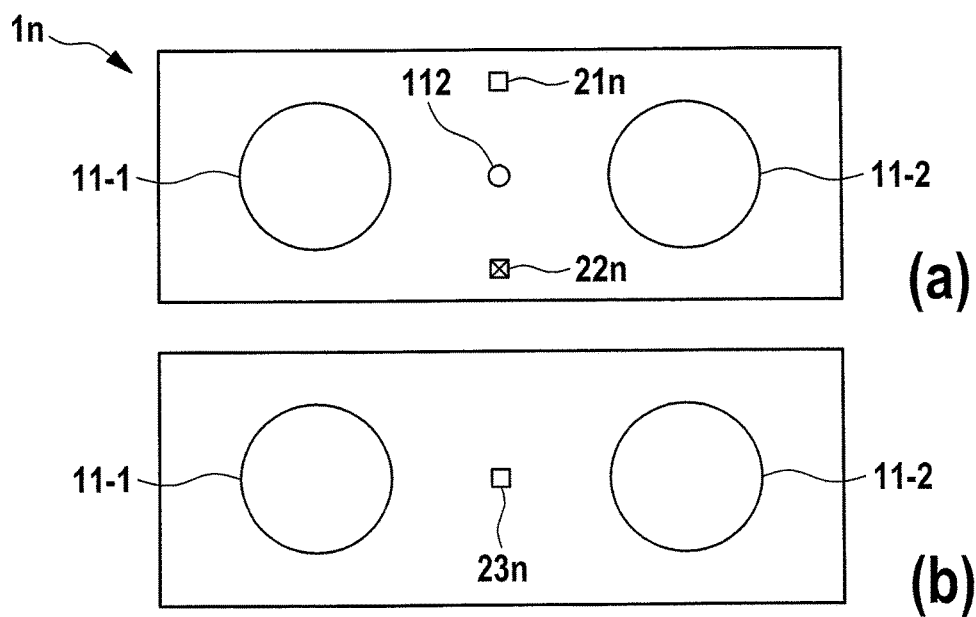
FIG. 15 shows a fifteenth embodiment of a surveillance apparatus according to the present disclosure.
Figure 16:
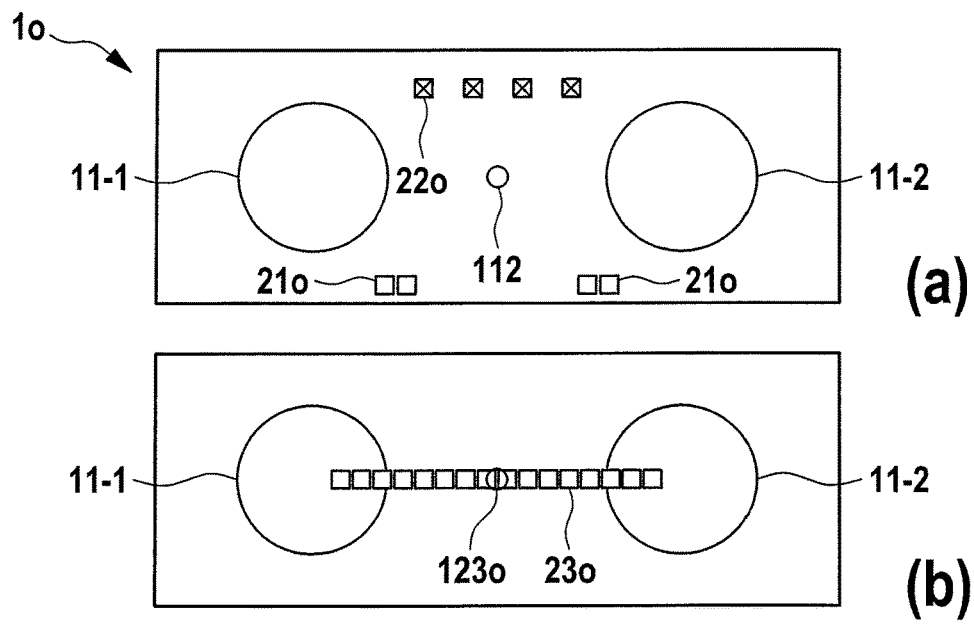
FIG. 16 shows a sixteenth embodiment of a surveillance apparatus according to the present disclosure.
Figure 17:
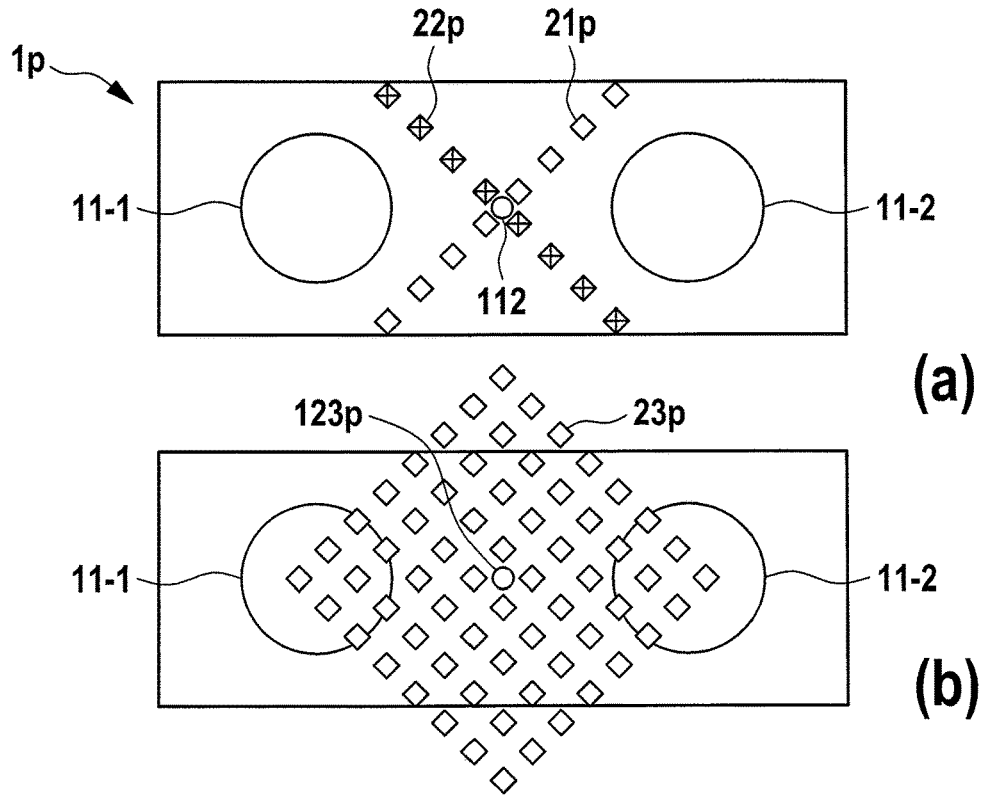
FIG. 17 shows a seventeenth embodiment of a surveillance apparatus according to the present disclosure.

FIGS. 15 to 17 show three further embodiments 1n, 1o, 1p of the surveillance apparatus according to the present disclosure including more than one camera, in this example two cameras represented in these figures by two individual camera apertures 11-1, 11-2. The surveillance apparatus 1n comprises a single Tx antenna 21n and a single Rx antenna 22n forming a virtual antenna 23n that is overlapping, in particular coincides, with the center area 112 of the (combined) camera aperture of the two camera apertures 11-1, 11-2, said center area 112 lying in between the two separate camera apertures 11-1, 11-2. The surveillance apparatus 1o comprises a line array of Tx antennas 210 and of Rx antennas 22o forming a virtual antenna array 23o having a center area 123o that is overlapping, in particular coincides, with the center area 112 of the (combined) camera aperture of the two camera apertures 11-1, 11-2. The surveillance apparatus 1p comprises a line array of Tx antennas 21p and of Rx antennas 22p that cross each other and that form a two-dimensional virtual antenna array 23p having a center area 123p that is overlapping, in particular coincides, with the center area 112 of the (combined) camera aperture of the two camera apertures 11-1, 11-2.

It shall be noted that the antenna arrays explained above are to be understood as exemplary embodiments for use in the proposed surveillance apparatus. Further variations of the antenna arrays may be used. By combining the radar information and the camera images, the automatic target detection can be improved by making joint decision based on the information from both camera and radar sensor. The radar sensor and the camera are pointing to the scene from the same or a little offset perspective, which make the data fusion for the radar and camera much easier.

Further, no additional movement element, such as a mechanical unit, is need for moving the radar sensor for scanning. A simple integration and compact design are thus possible, i.e. no significant size increase of the product is required. Finally, the radar antennas can even be retrofit to existing cameras, e.g. by placing a glass on top of the optical lens.

Thus, the foregoing discussion discloses and describes merely exemplary embodiments of the present disclosure. As will be understood by those skilled in the art, the present disclosure may be embodied in other specific forms without departing from the spirit or essential characteristics thereof. Accordingly, the disclosure of the present disclosure is intended to be illustrative, but not limiting of the scope of the disclosure, as well as other claims. The disclosure, including any readily discernible variants of the teachings herein, defines, in part, the scope of the foregoing claim terminology such that no inventive subject matter is dedicated to the public.

In the claims, the word "comprising" does not exclude other elements or steps, and the indefinite article "a" or "an" does not exclude a plurality. A single element or other unit may fulfill the functions of several items recited in the claims. The mere fact that certain measures are recited in mutually different dependent claims does not indicate that a combination of these measures cannot be used to advantage.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure. Further, such a software may also be distributed in other forms, such as via the Internet or other wired or wireless telecommunication systems, including fixed-wired logic, for example an ASIC (application-specific integrated circuit) or FPGA (field-programmable gate array).

It follows a list of further embodiments of the disclosed subject matter:

1. A surveillance apparatus comprising
an optical camera configured to capture images based on received light, said optical camera having a camera aperture,
a radar sensor having one or more transmitting antennas configured to emit electromagnetic radiation and one or more receiving antennas configured to receive electromagnetic radiation, said one or more transmitting antennas and said one or more receiving antennas forming a virtual antenna array, wherein said one or more transmitting antennas and said one or more receiving antennas are arranged such with respect to the optical camera that the center area of the virtual antenna array and the center area of the camera aperture are overlapping.

2. The surveillance apparatus according to embodiment 1, wherein said one or more transmitting antennas and said one or more receiving antennas are arranged on the periphery of the surveillance apparatus.

3. The surveillance apparatus according to embodiment 2, wherein said one or more transmitting antennas and said one or more receiving antennas are arranged around the camera aperture.

4. The surveillance apparatus according to embodiment 2, wherein said one or more transmitting antennas and said one or more receiving antennas are symmetrically arranged around the camera aperture.

5. The surveillance apparatus according to any preceding embodiment,
wherein at least one of said one or more transmitting antennas and/or at least one of said one or more receiving antennas are substantially translucent and are arranged on top of said camera aperture.

6. The surveillance apparatus according to embodiment 5, wherein a translucent antenna comprises an electrically conductive layer comprising at least one of a translucent electrically conductive material and an electrically conductive mesh structure.

7. The surveillance apparatus according to embodiment 6, wherein a first electrically conductive layer comprises a ground plane and a second electrically conductive layer comprises a transmitting antenna or a receiving antenna.

8. The surveillance apparatus according to embodiment 7, wherein the ground plane comprises a slot for feeding the transmitting antenna or a receiving antenna.

9. The surveillance apparatus according to embodiment 8, wherein the camera cover comprises at least one dielectric layer, in particular made from at least one of glass or a translucent polymer, and two electrically conductive layers.

10. The surveillance apparatus according to any preceding embodiment,
wherein the optical camera further comprises a camera frame and wherein said one or more transmitting antennas and said one or more receiving antennas are arranged at said frame.

11. The surveillance apparatus according to any preceding embodiment,
wherein the optical camera further comprises a translucent camera cover.

12. The surveillance apparatus according to embodiment 11,
wherein the camera cover comprises a substantially hemispheric camera dome, in particular having a polygonal, cylindrical or circular outline.

13. The surveillance apparatus according to embodiment 1,
wherein the radar sensor is adapted to provide at least one of a direction, range and speed of an object relative to the surveillance apparatus.

14. The surveillance apparatus according to any preceding embodiment,
further comprising processing circuitry that processes the captured images of the optical camera and the received electromagnetic radiation of the radar sensor and providing an indication of the detection of the presence of one or more objects.

15. The surveillance apparatus according to any preceding embodiment,
further comprising a movement unit for movement of the camera and/or the camera aperture, wherein said one or more transmitting antennas and said one or more receiving antennas are arranged to be moved together with the camera and/or the camera aperture.

16. The surveillance apparatus according to embodiment 1,
comprising a single optical camera having a single camera aperture, wherein the center area of the camera aperture corresponds to the central point of the camera aperture.

17. The surveillance apparatus according to embodiment 1, comprising two or more optical cameras each having an individual camera aperture, wherein the individual camera apertures form a single common camera aperture and wherein the center area of the common camera aperture corresponds to the central area of the individual camera apertures.

18. A surveillance radar apparatus for retrofitting an optical surveillance camera having a camera aperture, said surveillance radar apparatus comprising a housing for arrangement of the surveillance radar apparatus at the surveillance camera, and a radar sensor having one or more transmitting antennas configured to emit electromagnetic radiation and one or more receiving antennas configured to receive electromagnetic radiation, said one or more transmitting antennas and said one or more receiving antennas forming a virtual antenna array, wherein said one or more transmitting antennas and said one or more receiving antennas are arranged such with respect to the optical camera that the center area of the virtual antenna array and the center area of the camera aperture are overlapping.

19. A surveillance method comprising the steps of capturing images based on received light with an optical camera, said optical camera having a camera aperture, and emitting and receiving electromagnetic radiation with a radar sensor, having one or more transmitting antennas configured to emit electromagnetic radiation and one or more receiving antennas configured to receive electromagnetic radiation, said one or more transmitting antennas and said one or more receiving antennas forming a virtual antenna array, wherein said one or more transmitting antennas and said one or more receiving antennas are arranged such with respect to the optical camera that the center area of the virtual antenna array and the center area of the camera aperture are overlapping.

20. A non-transitory computer-readable recording medium that stores therein a computer program product, which, when executed by a processor, causes the method according to embodiment 19 to be performed.

21. A computer program comprising program code means for causing a computer to perform the steps of said method as defined in embodiment 19 when said computer program is carried out on a computer.

The invention claimed is:

1. A surveillance apparatus comprising:
   an optical camera configured to capture images based on received light, said optical camera having a camera aperture; and
   a radar sensor having one or more transmitting antennas configured to emit electromagnetic radiation and one or more receiving antennas configured to receive electromagnetic radiation, said one or more transmitting antennas and said one or more receiving antennas forming a virtual antenna array,
   wherein said one or more transmitting antennas and said one or more receiving antennas are arranged with respect to the optical camera such that the center area of the virtual antenna array and the center area of the camera aperture coincide, and
   at least one of said one or more transmitting antennas and/or at least one of said one or more receiving antennas is arranged to at least partially cover the camera aperture which is a physical feature of the optical camera.

2. The surveillance apparatus according to claim 1, wherein said one or more transmitting antennas and said one or more receiving antennas are arranged on the periphery of the surveillance apparatus.

3. The surveillance apparatus according to claim 2, wherein said one or more transmitting antennas and said one or more receiving antennas are arranged around the camera aperture.

4. The surveillance apparatus according to claim 2, wherein said one or more transmitting antennas and said one or more receiving antennas are symmetrically arranged around the camera aperture.

5. The surveillance apparatus according to claim 1, wherein at least one of said one or more transmitting antennas and/or at least one of said one or more receiving antennas are substantially translucent and are arranged on top of said camera aperture.

6. The surveillance apparatus according to claim 5, wherein a translucent antenna comprises an electrically conductive layer comprising at least one of a translucent electrically conductive material and an electrically conductive mesh structure.

7. The surveillance apparatus according to claim 6, wherein a first electrically conductive layer comprises a ground plane and a second electrically conductive layer comprises a transmitting antenna or a receiving antenna.

8. The surveillance apparatus according to claim 7, wherein the ground plane comprises a slot for feeding the transmitting antenna or a receiving antenna.

9. The surveillance apparatus according to claim 8, wherein the camera cover comprises at least one dielectric layer, in particular made from at least one of glass or a translucent polymer, and two electrically conductive layers.

10. The surveillance apparatus according to claim 1, wherein the optical camera further comprises a camera frame and wherein said one or more transmitting antennas and said one or more receiving antennas are arranged at said frame.

11. The surveillance apparatus according to claim 1, wherein the optical camera further comprises a translucent camera cover.

12. The surveillance apparatus according to claim 11, wherein the camera cover comprises a substantially hemispheric camera dome, in particular having a polygonal, cylindrical or circular outline.

13. The surveillance apparatus according to claim 1, wherein the radar sensor is adapted to provide at least one of a direction, range and speed of an object relative to the surveillance apparatus.

14. The surveillance apparatus according to claim 1, further comprising processing circuitry that processes the captured images of the optical camera and the received electromagnetic radiation of the radar sensor and providing an indication of the detection of the presence of one or more objects.

15. The surveillance apparatus according to claim 1, further comprising a movement unit for movement of the camera and/or the camera aperture, wherein said one or more transmitting antennas and said one or more receiving antennas are arranged to be moved together with the camera and/or the camera aperture.

16. The surveillance apparatus according to claim 1, comprising a single optical camera having a single camera aperture, wherein the center area of the camera aperture corresponds to the central point of the camera aperture.

17. The surveillance apparatus according to claim 1,
comprising two or more optical cameras each having an individual camera aperture, wherein the individual camera apertures form a single common camera aperture and wherein the center area of the common camera aperture corresponds to the central area of the individual camera apertures.

18. A surveillance method comprising:
capturing images based on received light with an optical camera, said optical camera having a camera aperture; and emitting and receiving electromagnetic radiation with a radar sensor, having one or more transmitting antennas configured to emit electromagnetic radiation and one or more receiving antennas configured to receive electromagnetic radiation, said one or more transmitting antennas and said one or more receiving antennas forming a virtual antenna array, wherein said one or more transmitting antennas and said one or more receiving antennas are arranged such with respect to the optical camera that the center area of the virtual antenna array and the center area of the camera aperture coincide, and at least one of said one or more transmitting antennas and/or at least one of said one or more receiving antennas is arranged to at least partially cover the camera aperture which is a physical feature of the optical camera.

19. A non-transitory computer-readable recording medium that stores therein a computer program product, which, when executed by a processor, causes the method according to claim 18 be performed.

* * * * *